(12) United States Patent
Chang et al.

(10) Patent No.: US 8,571,312 B2
(45) Date of Patent: Oct. 29, 2013

(54) IMAGE INTERPOLATION METHOD AND APPARATUS USING PATTERN CHARACTERISTICS OF COLOR FILTER ARRAY

(75) Inventors: Soon-keun Chang, Suwon-si (KR); Rae-hong Park, Seoul (KR); Ji-won Lee, Seoul (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 911 days.

(21) Appl. No.: 12/689,312

(22) Filed: Jan. 19, 2010

(65) Prior Publication Data

US 2010/0182466 A1 Jul. 22, 2010

(30) Foreign Application Priority Data

Jan. 16, 2009 (KR) .................. 10-2009-0003719
Oct. 16, 2009 (KR) .................. 10-2009-0098876

(51) Int. Cl.
*G06K 9/00* (2006.01)
(52) U.S. Cl.
USPC ..................... 382/167; 382/162; 382/300
(58) Field of Classification Search
USPC ........................ 382/162–167, 200
See application file for complete search history.

(56) References Cited

U.S. PATENT DOCUMENTS

| | | | |
|---|---|---|---|
| 5,054,100 A * | 10/1991 | Tai | 382/300 |
| 6,628,330 B1 * | 9/2003 | Lin | 348/252 |
| 6,904,166 B2 * | 6/2005 | Hsia et al. | 382/162 |
| 7,088,392 B2 * | 8/2006 | Kakarala et al. | 348/272 |
| 7,305,123 B2 * | 12/2007 | Messina et al. | 382/162 |
| 7,486,844 B2 * | 2/2009 | Chang et al. | 382/300 |
| 7,822,293 B2 * | 10/2010 | Jerdev | 382/300 |
| 7,835,573 B2 * | 11/2010 | Kang et al. | 382/167 |
| 8,131,110 B2 * | 3/2012 | Lukac | 382/274 |
| 8,208,748 B2 * | 6/2012 | Joon-Ki et al. | 382/264 |
| 2005/0157951 A1 * | 7/2005 | Xavier | 382/300 |
| 2005/0201616 A1 * | 9/2005 | Malvar et al. | 382/167 |
| 2006/0133698 A1 * | 6/2006 | Kim et al. | 382/300 |
| 2007/0002154 A1 * | 1/2007 | Kang et al. | 348/272 |
| 2007/0110300 A1 * | 5/2007 | Chang et al. | 382/162 |
| 2009/0214132 A1 * | 8/2009 | Yamada et al. | 382/266 |
| 2010/0061625 A1 * | 3/2010 | Lukac | 382/162 |
| 2010/0104183 A1 * | 4/2010 | Hasegawa | 382/167 |
| 2010/0182466 A1 * | 7/2010 | Chang et al. | 348/273 |
| 2012/0257821 A1 * | 10/2012 | Saito et al. | 382/162 |

OTHER PUBLICATIONS

Li, "Demosaicing by Successive Approximation," IEEE Transactions on Image Processing, vol. 14 (3), pp. 370-379 (Mar. 2005).
Lu et al., "Color Filter Array Demosaicking: New Method and Performance Measures," IEEE Transactions on Image Processin., vol. 12(10), pp. 1194-1210 (Oct. 2003).

* cited by examiner

*Primary Examiner* — Gandhi Thirugnanam
(74) *Attorney, Agent, or Firm* — Drinker Biddle & Reath LLP

(57) ABSTRACT

An image interpolating method and apparatus, in which horizontal and vertical Differences of Absolute Inter-channel Differences (DAIDs) are calculated from a color filter array (CFA) image, and an unknown pixel is interpolated in horizontal and vertical directions estimated in consideration of the DAIDs of R, G, and B pixels. Therefore, the image interpolating method and apparatus provide a large Peak Signal and Noise Ratio (PSNR), a Structural Similarity (SSIM), and high visual quality images.

20 Claims, 9 Drawing Sheets

FIG. 1A

| $R_{i-2, j-2}$ | $G_{i-2, j-1}$ | $R_{i-2, j}$ | $G_{i-2, j+1}$ | $R_{i-2, j+2}$ |
|---|---|---|---|---|
| $G_{i-1, j-2}$ | $B_{i-1, j-1}$ | $G_{i-1, j}$ | $B_{i-1, j+1}$ | $G_{i-1, j+2}$ |
| $R_{i, j-2}$ | $G_{i, j-1}$ | $R_{i, j}$ | $G_{i, j+1}$ | $R_{i, j+2}$ |
| $G_{i+1, j-2}$ | $B_{i+1, j-1}$ | $G_{i+1, j}$ | $B_{i+1, j+1}$ | $G_{i+1, j+2}$ |
| $R_{i+2, j-2}$ | $G_{i+2, j-1}$ | $R_{i+2, j}$ | $G_{i+2, j+1}$ | $R_{i+2, j+2}$ |

FIG. 1B

| $B_{i-2, j-2}$ | $G_{i-2, j-1}$ | $B_{i-2, j}$ | $G_{i-2, j+1}$ | $R_{i-2, j+2}$ |
|---|---|---|---|---|
| $G_{i-1, j-2}$ | $R_{i-1, j-1}$ | $G_{i-1, j}$ | $R_{i-1, j+1}$ | $G_{i-1, j+2}$ |
| $B_{i, j-2}$ | $G_{i, j-1}$ | $B_{i, j}$ | $G_{i, j+1}$ | $B_{i, j+2}$ |
| $G_{i+1, j-2}$ | $R_{i+1, j-1}$ | $G_{i+1, j}$ | $R_{i+1, j+1}$ | $G_{i+1, j+2}$ |
| $B_{i+2, j-2}$ | $G_{i-2, j-1}$ | $B_{i-2, j}$ | $G_{i+2, j+1}$ | $B_{i+2, j+2}$ |

FIG. 1C

| $G_{i-2, j-2}$ | $B_{i-2, j-1}$ | $G_{i-2, j}$ | $G_{i-2, j+1}$ | $G_{i-2, j+2}$ |
|---|---|---|---|---|
| $R_{i-1, j-2}$ | $G_{i-1, j-1}$ | $R_{i-1, j}$ | $G_{i-1, j+1}$ | $R_{i-1, j+2}$ |
| $G_{i, j-2}$ | $B_{i, j-1}$ | $G_{i, j}$ | $B_{i, j+1}$ | $G_{i, j+2}$ |
| $R_{i+1, j-2}$ | $G_{i+1, j-1}$ | $R_{i+1, j}$ | $G_{i+1, j+1}$ | $R_{i+1, j+2}$ |
| $G_{i+2, j-2}$ | $B_{i-2, j-1}$ | $G_{i-2, j}$ | $B_{i+2, j+1}$ | $G_{i+2, j+2}$ |

FIG. 4A

|  U |  |  |  | R |
|---|---|---|---|---|
| $R_{i-2,j-2}$ | $G_{i-2,j-1}$ | $B_{i-2,j}$ | $G_{i-2,j+1}$ | $B_{i-2,j+2}$ |
| $G_{i-1,j-2}$ | $R_{i-1,j-1}$ | $G_{i-1,j}$ | $R_{i-1,j+1}$ | $G_{i-1,j+2}$ |
| $B_{i,j-2}$ | $G_{i,j-1}$ | $B_{i,j}$ | $G_{i,j+1}$ | $B_{i,j+2}$ |
| $G_{i+1,j-2}$ | $R_{i+1,j-1}$ | $G_{i+1,j}$ | $R_{i+1,j+1}$ | $G_{i+1,j+2}$ |
| $B_{i+2,j-2}$ | $G_{i-2,j-1}$ | $B_{i+2,j}$ | $G_{i+2,j+1}$ | $B_{i+2,j+2}$ |
|  L |  |  |  | D |

FIG. 4B

|  | | U | | |
|---|---|---|---|---|
| $G_{i-2,j-2}$ | $B_{i-2,j-1}$ | $G_{i-2,j}$ | $G_{i-2,j+1}$ | $G_{-2,j+2}$ |
| $R_{i-1,j-2}$ | $G_{i-1,j-1}$ | $R_{i-1,j}$ | $G_{i-1,\,+1}$ | $R_{i-1,j+2}$ |
| $G_{i,j-2}$ | $B_{i,j-1}$ | $G_{i,j}$ | $B_{i,j+1}$ | $G_{i,j+2}$ |
| $R_{i+1,j-2}$ | $G_{i-1,j-1}$ | $R_{i+1,j}$ | $G_{i+1,j+1}$ | $R_{i+1,j+2}$ |
| $G_{i+2,j-2}$ | $B_{i-2,j-1}$ | $G_{i+2,j}$ | $B_{i+2,j+1}$ | $G_{i+2,j+2}$ |

L ... R (middle row), D (bottom)

FIG. 4C

|   |   |   |   |   |
|---|---|---|---|---|
| $R_{i-2,j-2}$ | $G_{i-2,j-1}$ | $R_{i-2,j}$ | $G_{i-2,j+1}$ | $R_{i-2,j+2}$ |
| $G_{i-1,j-2}$ | $B_{i-1,j-1}$ | $G_{i-1,j}$ | $B_{i-1,j+1}$ | $G_{i-1,j+2}$ |
| $R_{i,j-2}$ | $G_{i,j-1}$ | $R_{i,j}$ | $G_{i,j+1}$ | $R_{i,j+2}$ |
| $G_{i+1,j-2}$ | $B_{i-1,j-1}$ | $G_{i+1,j}$ | $B_{i+1,j+1}$ | $G_{i+1,j+2}$ |
| $R_{i+2,j-2}$ | $G_{i-2,j-1}$ | $R_{i+2,j}$ | $G_{i+2,j+1}$ | $R_{i+2,j+2}$ |

U (top-left), R (top-right), L (bottom-left), D (bottom-right) with diagonal dashed lines.

FIG. 4D

|   |   |   |   |   |
|---|---|---|---|---|
| $G_{i-2,j-2}$ | $B_{i-2,j-1}$ | $G_{i-2,j}$ | $G_{i-2,j+1}$ | $G_{-2,j+2}$ |
| $R_{i-1,j-2}$ | $G_{i-1,j-1}$ | $R_{i-1,j}$ | $G_{i-1,,+1}$ | $R_{i-1,j+2}$ |
| $G_{i,j-2}$ | $B_{i,j-1}$ | $G_{i,j}$ | $B_{i,j+1}$ | $G_{i,j+2}$ |
| $R_{i+1,j-2}$ | $G_{i-1,j-1}$ | $R_{i+1,j}$ | $G_{i+1,j+1}$ | $R_{i+1,j+2}$ |
| $G_{i+2,j-2}$ | $B_{i-2,j-1}$ | $G_{i+2,j}$ | $B_{i+2,j+1}$ | $G_{i+2,j+2}$ |

U (top), D (bottom), L (left), R (right) with vertical and horizontal dashed lines.

IMAGE INTERPOLATION METHOD AND APPARATUS USING PATTERN CHARACTERISTICS OF COLOR FILTER ARRAY

CROSS-REFERENCE TO RELATED PATENT APPLICATION

This application claims the benefits of Korean Patent Application No. 10-2009-0003719, filed on Jan. 16, 2009, and Korean Patent Application No. 10-2009-0098876, filed on Oct. 16, 2009, in the Korean Intellectual Property Office, the entire disclosure of both applications are herein incorporated by reference.

BACKGROUND OF THE INVENTION

1. Field of the Invention

The present invention relates to image processing, and more particularly, to an image interpolation method and apparatus.

2. Description of the Related Art

Most digital cameras and camcorders can capture color images by using a color charge-coupled device (CCD) or complimentary metal oxide semiconductor (CMOS). Captured images are images mosaicked according to the pattern of a color filter array (hereinafter, referred to as a 'CFA'). Pixels of the mosaicked images each have two unknown color values and one known color value. The CFA pattern is formed of red (R), green (G), and blue (B) channels, and each channel is decimated according to other factors. In some implementations, the number of pixels in the decimated G channel is twice the number of pixels in the decimated R channel and twice the number of pixels in the decimated B channel. R/B pixels alternate with G pixels across a column or row. In other words, G and R pixels alternate, or G and B pixels alternate across a row or column.

Demosaicing, that is, CFA interpolation, is a process of reconstructing unknown R, G, and B components in order to generate a full-color image. Two unknown color values of each pixel may be predicted using any of various demosaicking algorithms. In demosaicking algorithms, a full-color image is reconstructed from incomplete data, namely, pixels in which two color values are missing. Such reconstruction algorithms use inter-channel or within-channel correlation of available data in R, G, and B channels.

A conventional adaptive demosaicing algorithm considers a color correlation and local characteristics of an image. Edge-directed interpolation and various adaptive weighted summation interpolation methods use an adaptive weight in order to interpolate unknown pixel values. Since a high correlation between inter-channel color differences, namely, color differences between R and G channels and between B and G channels, exists in a high-frequency region of a color image, conventional demosaicing algorithms may use this correlation.

Conventional adaptive demosaicing algorithms are introduced by X. Li ["Demosaicing by Successive Approximation," IEEE Trans. Image Process., vol. 14, no. 3, pp. 370-379, March 2005], and by W. Lu ["Color Filter Array Demosaicing: New Method and Performance Measures", IEEE Trans. Image Process., vol. 12, no. 10, pp. 1194-1210, October 2003].

Li's algorithm updates initially-interpolated pixel values by initially interpolating color channels and detecting an edge direction by using a value to which a Laplacian filter is applied in a color difference domain corresponding to a calculated color difference between two different initially-interpolated color channels. Updating is repeated until a stop criterion is satisfied, so that generations of false color and zipper flaws are prevented. To do this, estimated values of unknown color pixel values are adjusted by emphasizing a color difference rule in every repetition.

Lu's algorithm is an edge sensing algorithm using a color difference model or a color-ratio model. In Lu's algorithm, edges are maintained by interpolation along the edges instead of interpolation across the edges. In the method, to estimate unknown color pixel values, a spatial correlation between adjacent pixels is considered, and a suitable interpolation direction is determined using the adjacent pixels.

The above-described conventional demosaicing algorithms produce high-quality demosaiced images, and are particularly effective in reconstructing high-frequency regions of a color image, such as sharp edges. However, Li's algorithm has a low calculation speed because initially-interpolated pixel updates are repeated until a stop criterion is satisfied. In addition, Li's algorithm repeatedly changes an initially-interpolated pixel value and thus a wrong edge direction may be detected.

Moreover, the above-described conventional demosaicing algorithms do not sufficiently reduce artifacts such as a zipper effect, false color, and aliasing. A false color around edges and texturing of a demosaiced image causes the quality of image to be degraded. Overshoot flaws, such as the zipper effect and sharp color edges of a demosaiced image, are disadvantages of an adaptive algorithm.

SUMMARY OF THE INVENTION

The present invention provides an image interpolating method and apparatus capable of detecting an edge direction from Differences of Absolute Inter-channel Differences (DAIDs) in consideration of the characteristics of a color filter array (CFA) and interpolating unknown color pixel values directly from a CFA image in the detected edge direction.

According to an aspect of the present invention, there is provided an image interpolating method including detecting an edge direction by calculating absolute inter-channel differences with respect to left, right, up, and down directions of a central pixel of a color filter array according to pattern characteristics of R, G, and B pixels arranged in the color filter array; calculating directional interpolation weights for the left, right, up, and down directions, respectively, according to the pattern characteristics of the R, G, and B pixels; and interpolating an unknown pixel value using color differences between the R, G, and B pixels with respect to the left, right, up, and down directions of the center pixel and the directional interpolation weights according to the detected edge direction.

The absolute inter-channel differences may be differences between values of pixels that are adjacent to each other in the left, right, up, and down directions.

The detecting of the edge direction may include calculating a horizontal difference $D_H$ for the left and right directions and a vertical difference $D_V$ for the up and down directions from the absolute inter-channel differences with respect to the left, right, up, and down directions.

The detecting of the edge direction may include, if the central pixel of the color filter array is $R_{i,j}$, calculating the horizontal difference $D_H$ and the vertical difference $D_V$ according to the following Equations 4 and 5:

$$D_H = D_H^L - D_H^R = |R_{i,j-2} - G_{i,j-1}| - |R_{i,j-2} - G_{i,j+1}| \quad \text{[Equation 4]}$$

$$D_V = D_V^U - D_V^D = |R_{i-2,j} - G_{i-1,j}| - |R_{i+2,j} - G_{i+1,j}| \quad \text{[Equation 5]}$$

where $R_{p,q}$ and $G_{p,q}$ denote color intensity values at positions (p,q) in the R and G channels, respectively, and $D_H^L$, $D_H^R$, $D_V^U$, and $D_V^D$ denote inter-channel differences with respect to the left, right, up, and down directions, respectively.

The interpolating of the unknown pixel value may include, if the central pixel of the color filter array is $R_{i,j}$, interpolating an unknown G pixel value according to the following Equation 6:

$$G'_{i,j} = + \begin{cases} R_{i,j} + \dfrac{\gamma_H^L \Delta G_H^L + \gamma_H^R \Delta G_H^R}{\gamma_H^L + \gamma_H^R}, & D_H < D_V \\ R_{i,j} + \dfrac{\gamma_V^U \Delta G_V^U + \gamma_V^D \Delta G_V^D}{\gamma_V^U + \gamma_V^D}, & D_H > D_V \\ R_{i,j} + \dfrac{\gamma_H^L \Delta G_H^L + \gamma_H^R \Delta G_H^R + \gamma_V^U \Delta G_V^U + \gamma_V^D \Delta G_V^D}{\gamma_H^L + \gamma_H^R + \gamma_V^U + \gamma_V^D}, & \text{otherwise} \end{cases}$$

[Equation 6]

where $G'_{i,j}$ denotes an interpolated G pixel value, $\Delta G_H^L$, $\Delta G_H^R$, $\Delta G_V^U$, and $\Delta G_V^D$ denote color differences defined with respect to the left, right, up, and down directions, respectively, and $\gamma_H^L$, $\gamma_H^R$, $\gamma_V^U$, and $\gamma_V^D$ denote directional interpolation weights defined with respect to the left, right, up, and down directions, respectively.

The interpolating of the unknown pixel value may include, after a G pixel from among unknown pixels is interpolated, interpolating the values of the other unknown pixels using a pixel value G' of the interpolated G pixel.

The interpolating of the unknown pixel value may include, if the central pixel of the color filter array is $B_{i,j}$, interpolating an unknown R pixel value according to the following Equation 15:

$$R'_{i,j} = G'_{i,j} + \dfrac{\gamma_H^L \Delta R_H^L + \gamma_H^R \Delta R_H^R + \gamma_V^U \Delta R_V^U + \gamma_V^D \Delta R_V^D}{\gamma_H^L + \gamma_H^R + \gamma_V^U + \gamma_V^D}$$

[Equation 15]

where $R'_{i,j}$ and $G'_{i,j}$ denotes interpolated pixel values, $\Delta R_H^L$, $\Delta R_H^R$, $\Delta R_V^U$, and $\Delta R_V^D$ denote color differences defined with respect to the left, right, up, and down directions of the center pixel, respectively, $\Delta R_H^{L=R} = R_{i+1,j-1} - G'_{i+1,j-1}$, $\Delta R_{hu\ R} = R_{i-1,j+1} - G'_{i-1,j+1}$, $\Delta R_V^U = R_{i-1,j-1} - G'_{i-1,j+1}$, and $\Delta R_V^D = R_{i+1,j+1} - G'_{i+1,j+1}$, and $\gamma_H^L$, $\gamma_H^R$, $\gamma_V^U$, and $\gamma_V^D$ denote directional interpolation weights defined with respect to the left, right, up, and down directions, respectively.

If the central pixel of the color filter array is $G_{i,j}$, the color differences defined with respect to the left, right, up, and down directions in Equation 15 may be $\Delta R_H^L = R'_{i,j-1} - G'_{i,j-1}$, $\Delta R_H^R = R'_{i,j+1} - G'_{i,j+1}$, $\Delta R_V^U = R_{i-1,j} - G'_{i-1,j}$, and $\Delta R_V^D = R_{i+1,j} - G'_{i+1,j}$, respectively.

The image interpolating method may further include adjusting the interpolated pixel value by adding a high frequency component of a known pixel to the interpolated pixel value.

According to another aspect of the present invention, there is provided a computer readable recording medium encoded with computer-executable instructions. When the computer readable medium is executed by a computer the following method is performed: detecting an edge direction by calculating absolute inter-channel differences with respect to left, right, up, and down directions of a central pixel of a color filter array according to pattern characteristics of R, G, and B pixels arranged in the color filter array; calculating directional interpolation weights for the left, right, up, and down directions, respectively, according to the pattern characteristics of the R, G, and B pixels; and interpolating an unknown pixel value using color differences between the R, G, and B pixels with respect to the left, right, up, and down directions of the center pixel and the directional interpolation weights according to the detected edge direction.

According to another aspect of the present invention, there is provided an image interpolating apparatus including an edge direction detection unit for detecting an edge direction by calculating absolute inter-channel differences with respect to left, right, up, and down directions of a central pixel of a color filter array according to pattern characteristics of R, G, and B pixels arranged in the color filter array; a weight calculation unit for calculating directional interpolation weights for the left, right, up, and down directions, respectively, according to the pattern characteristics of the R, G, and B pixels; and an interpolation unit for interpolating an unknown pixel value using color differences between the R, G, and B pixels with respect to the left, right, up, and down directions and the directional interpolation weights according to the detected edge direction.

The absolute inter-channel differences may be differences between values of pixels that are adjacent to each other in the left, right, up, and down directions.

The edge direction detection unit may calculate a horizontal difference $D_H$ for the left and right directions and a vertical difference $D_V$ for the up and down directions from the absolute inter-channel differences with respect to the left, right, up, and down directions.

If the central pixel of the color filter array is $R_{i,j}$, the edge direction detection unit may calculate the horizontal difference $D_H$ and the vertical difference $D_V$ according to the above-described Equations 4 and 5.

If the central pixel of the color filter array is $R_{i,j}$, the interpolation unit may interpolate an unknown G pixel value according to the above-described Equation 6.

After a G pixel from among unknown pixels is interpolated, the interpolation unit may interpolate the values of the other unknown pixels using a pixel value G' of the interpolated G pixel.

If the central pixel of the color filter array is $B_{i,j}$, the interpolation unit may interpolate an unknown R pixel value according to the above-described Equation 15.

If the central pixel of the color filter array is $G_{i,j}$ the color differences defined with respect to the left, right, up, and down directions in Equation 15 may be $\Delta R_H^L = R'_{i,j-1} - G'_{i,j-1}$, $\Delta R_H^R = R'_{i,j+1} - G'_{i,j+1}$, $\Delta R_V^U = R_{i-1,j} - G'_{i-1,j}$, and $\Delta R_V^D = R_{i+1,j} - G'_{i+1,j}$, respectively.

The image interpolating apparatus may further include an adjusting unit for adjusting the interpolated pixel value by adding a high frequency component of a known pixel to the interpolated pixel value.

According to another aspect of the present invention there is provided an image interpolating method. The method includes detecting an edge direction by calculating absolute inter-channel differences with respect to left, right, up, and down directions of a central pixel of a color filter array according to pattern characteristics of different color pixels arranged in the color filter array; calculating directional interpolation weights for the left, right, up, and down directions, respectively, according to the pattern characteristics of the different color pixels; and interpolating an unknown pixel value using color differences between the different color pixels with respect to the left, right, up, and down directions of the center pixel and the directional interpolation weights according to the detected edge direction.

BRIEF DESCRIPTION OF THE DRAWINGS

The above and other features and advantages of the present invention will become more apparent by describing in detail exemplary embodiments thereof with reference to the attached drawings in which:

FIGS. 1A through 1C illustrate examples of 5×5 bayer color filter array (CFA) patterns having red (R), blue (B), and green (G) pixels as center pixels (i,j), respectively;

FIGS. 4A through 4D are diagrams for explaining an example of a method of calculating a color difference value in a CFA pattern in order to interpolate unknown pixels;

DETAILED DESCRIPTION OF THE INVENTION

Figure 2:
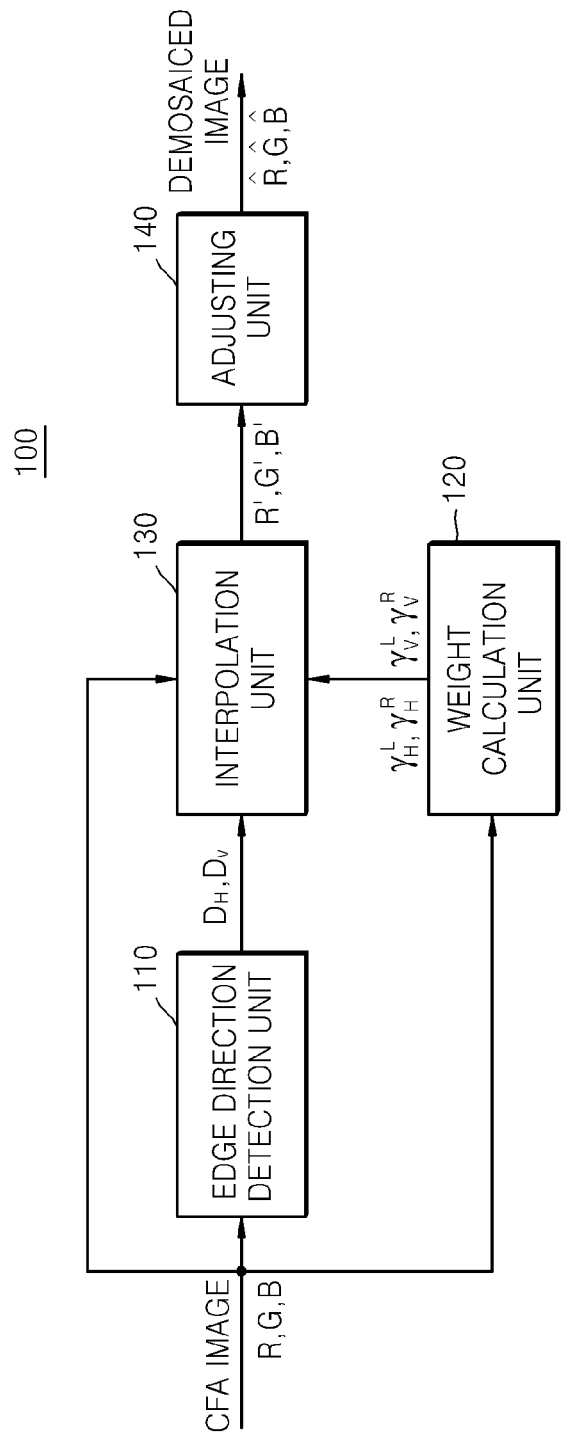
FIG. 2 is a schematic block diagram of an example of an image interpolation apparatus using the characteristics of a CFA pattern, according to an embodiment of the present invention.

The present invention will now be described more fully with reference to the accompanying drawings, in which examples of embodiments of the invention are shown. Terms should be interpreted based on the contents of the entire specification.

FIGS. 1A through 1C illustrate 5×5 bayer color filter array (CFA) patterns. With regards to pixels in each of the patterns, half of the pixels in each of the patterns is green (G) and the other half is formed of red (R) and blue (B) pixels. Each pixel of such patterns is sensitive to only one color, that is, sensitive to R, G, or B. Thus, color images obtained using these patterns are interpolated via three color channels to produce a full-color image. Interpolation in this way is referred to as a CFA demosaicing or interpolation.

The basic concept of a general adaptive weight summation algorithm is to estimate a local distribution of a mosaicked image and use the local distribution to achieve demosaicing. Most conventional adaptive weight summation algorithms acquire a demosaicked image by using a weight summation of the intensities of adjacent pixels.

As described above, FIGS. 1A, 1B, and 1C illustrate 5×5 bayer CFA patterns respectively having R, B, and G pixels at the centers thereof. Referring to the CFA pattern of FIG. 1A, an unknown G pixel is first predicted in consideration of a directivity of interpolation by using horizontal and vertical gradients. The horizontal and vertical gradients are expressed as in Equations 1 and 2, respectively.

$$\Delta H_{i,j} = |G_{i,j-1} - G_{i,j+1}| + |2R_{i,j} - R_{i,j-2} - R_{i,j+2}| \quad \text{Equation 1}$$

$$\Delta V_{i,j} = |G_{i-1,j} - G_{i+1,j}| + |2R_{i,j} - R_{i-2,j} - R_{i+2,j}| \quad \text{Equation 2}$$

where $G_{p,q}$ and $R_{p,q}$ denote known G and R pixel intensity values (hereinafter, referred to as pixel values) in a position (p,q) of the CFA pattern of FIG. 1A. An unknown G pixel value $\hat{G}_{i,j}$ is calculated in consideration of the horizontal gradient $\Delta H_{i,j}$ and the vertical gradient $\Delta V_{i,j}$ according to Equation 3.

$$\hat{G}_{i,j} = \begin{cases} \dfrac{G_{i,j-1} + G_{i,j+1}}{2} + \dfrac{2R_{i,j} - R_{i,j-2} - R_{i,j+2}}{4}, & \text{if } \Delta H_{i,j} < \Delta V_{i,j} \\ \dfrac{G_{i-1,j} + G_{i+1,j}}{2} + \dfrac{2R_{i,j} - R_{i-2,j} - R_{i+2,j}}{4}, & \text{if } \Delta H_{i,j} > \Delta V_{i,j} \\ \dfrac{G_{i-1,j} + G_{i+1,j} + G_{i,j-1} + G_{i,j+1}}{4} + \\ \dfrac{4R_{i,j} - R_{i-2,j} - R_{i+2,j} - R_{i,j-2} - R_{i,j+2}}{8}, & \text{otherwise.} \end{cases} \quad \text{Equation 3}$$

FIG. 1B is similar to FIG. 1A except that $R_{p,q}$ is replaced by $B_{p,q}$. Accordingly, an unknown G pixel value $\hat{G}_{i,j}$ in the CFA pattern of FIG. 1B is calculated by solving Equations 1 through 3 in the same way as in FIG. 1A except that $B_{p,q}$ is substituted for $R_{p,q}$ in Equations 1 through 3.

FIG. 1C illustrates the 5×5 bayer CFA pattern having a G center pixel that has an unknown R pixel value and an unknown B pixel value. The unknown R and B pixel values are estimated using an interpolated G pixel value $\hat{G}_{i,j}$ on the assumption that high-frequency components have similarity between three color components, namely, R, G and B.

FIG. 2 is a schematic block diagram of an example of an image interpolation apparatus 100 using the characteristics of a CFA pattern, according to an embodiment of the present invention.

Referring to FIG. 2, the image interpolation apparatus 100 includes an edge direction detection unit 110, a weight calculation unit 120, an interpolation unit 130, and an adjusting unit 140.

According to an example of an embodiment of the present invention, horizontal and vertical Differences of Absolute Inter-channel Differences (DAIDs) are directly calculated from a CFA image in order to determine an interpolation direction. In general, an artifact generally appearing in a high frequency region of a demosaicked image is primarily generated by aliasing in an R/B channel, because the numbers of pixels in decimated R/B channels are half the number of pixels in a decimated G channel. A high correlation between R, G, and B color channels, that is, an inter-channel correlation, exists in a high-frequency region of a color image.

High-frequency components of the R, G, and B channels are large in edge and texture regions of an image. It is assumed that the positions of edges in the R, G, and B channels are identical. An absolute inter-channel difference (AID) is used to predict an edge direction and a directional interpolation weight, and is directly calculated from a CFA pattern. G and R components alternate in a central row of FIG. 1A. Similarly, B and G components and the R and G components may be applied to FIGS. 1B and 1C. An interpolation direction for a pixel is calculated using the values of pixels adjacent in the horizontal and vertical directions, and a directional interpolation weight for a pixel is estimated using a spatial correlation between pixels adjacent in the calculated interpolation direction.

The edge direction detection unit 110 detects an edge direction by calculating AIDs with respect to left, right, up, and down directions of a central pixel of a CFA pattern according to the pattern characteristics of the CFA pattern in which R, G, and B pixels are arranged. DAIDs $D_H$ and $D_V$ are calculated to detect the edge direction. To calculate the DAIDs $D_H$ and $D_V$, AIDs $D_H^L$, $D_H^R$, $D_V^U$, and $D_V^D$ are used. For example, if the CFA pattern of FIG. 1A is used, the DAIDs $D_H$ and $D_V$ are defined in the horizontal and vertical directions, respectively, in Equations 4 and 5, respectively.

$$D_H = D_H^L - D_H^R = |R_{i,j-2} - G_{i,j-1}| - |R_{i,j+2} - G_{i,j+1}| \quad \text{Equation 4}$$

$$D_V = D_V^U - D_V^D = |R_{i-2,j} - G_{i-1,j}| - |R_{i+2,j} - G_{i+1,j}| \quad \text{Equation 5}$$

where $R_{p,q}$ and $G_{p,q}$ denote color intensity values in a position (p,q) in the R and G channels, respectively, and AIDs $D_H^L$, $D_H^R$, $D_V^U$, and $D_V^D$ denote AIDs with respect to the left, right, up, and down directions of a central pixel of the CFA pattern of FIG. 1A, respectively. The DAIDs $D_H$ and $D_V$ are calculated from a pixel $R_{i,j}$ at the center of the CFA pattern of FIG. 1A, using a 5×5 window.

FIG. 1B is similar to FIG. 1A except that $R_{p,q}$ is replaced by $B_{p,q}$. Accordingly, if the CFA pattern of FIG. 1B is used, the DAIDs $D_H$ and $D_V$ are calculated by substituting $B_{p,q}$ for $R_{p,q}$ in Equations 4 and 5. If the CFA pattern of FIG. 1C is used, the DAIDs $D_H$ and $D_V$ are calculated by substituting $G_{p,q}$ for $R_{p,q}$ in Equations 4 and 5, $B_{p,q}$ for $G_{p,q}$ in Equation 4, and $R_{p,q}$ for $G_{p,q}$ in Equation 5.

The weight calculation unit 120 calculates directional interpolation weights with respect to the left, right, up, and down directions according to the characteristics of a pattern of R, G, and B pixels.

The interpolation unit 130 interpolates an unknown pixel by using color differences, for example, $\Delta G_H^L$, $\Delta G_H^R$, $\Delta G_V^U$, and $\Delta G_V^D$, with respect to left, right, up, and down directions from a R, G, or B pixel and the directional interpolation weights calculated by the weight calculation unit 120, namely, $\gamma_H^L$, $\gamma_H^R$, $\gamma_V^U$, and $\gamma_V^D$, according to the edge direction detected by the edge direction detection unit 110, that is, the horizontal DAID $D_H$ and the vertical DAID $D_V$.

After the detection of the edge direction, directional interpolation weights are induced, and unknown pixel values are adaptively interpolated using the color differences and the directional interpolation weights.

Figure 3:
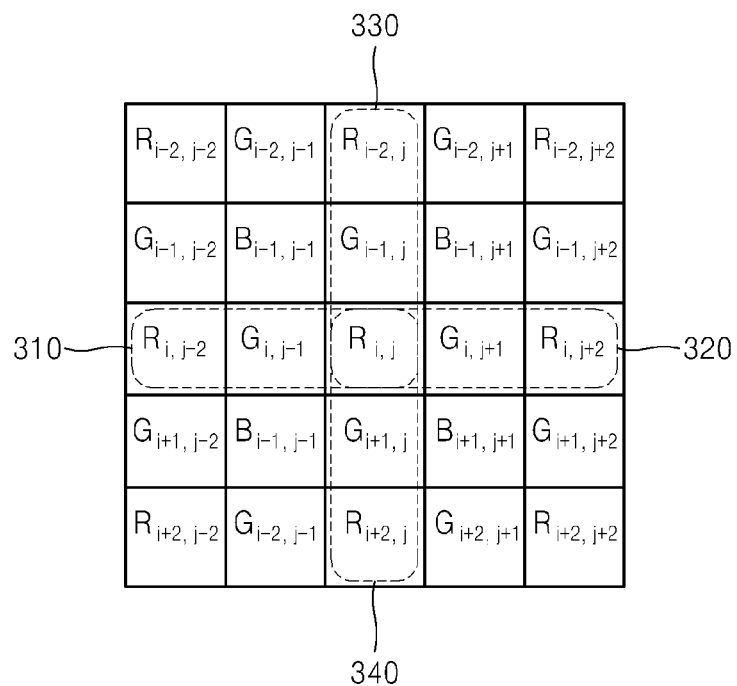
FIG. 3 is a diagram for explaining an example of a method of calculating a color difference value in a CFA pattern in order to interpolate unknown pixels.

In FIG. 1A, an R pixel exists at the center of the 5×5 bayer CFA pattern, and the unknown G pixel value $G'_{i,j}$ is interpolated using Equation 6.

$$G'_{i,j} = \begin{cases} R_{i,j} + \dfrac{\gamma_H^L \Delta G_H^L + \gamma_H^R \Delta G_H^R}{\gamma_H^L + \gamma_H^R}, & D_H < D_V \\ R_{i,j} + \dfrac{\gamma_V^U \Delta G_V^U + \gamma_V^D \Delta G_V^D}{\gamma_V^U + \gamma_V^D}, & D_H > D_V \\ R_{i,j} + \dfrac{\gamma_H^L \Delta G_H^L + \gamma_H^R \Delta G_H^R +}{\gamma_H^L + \gamma_H^R + \gamma_V^U + \gamma_V^D}, & \text{otherwise} \\ \quad\quad\quad\dfrac{\gamma_V^U \Delta G_V^U + \gamma_V^D \Delta G_V^D}{\gamma_H^L + \gamma_H^R + \gamma_V^U + \gamma_V^D} \end{cases} \quad \text{Equation 6}$$

where $\Delta G_H^L$, $\Delta G_H^R$, $\Delta G_V^U$, and $\Delta G_V^D$ denote the color differences defined with respect to the left, right, up, and down directions of the center pixel $R_{i,j}$ and are calculated using Equations 7, 8, 9, and 10, respectively. In more detail, $\Delta G_H^L$ is calculated with respect to a left direction 310 of FIG. 3 using Equation 7, $\Delta G_H^R$ is calculated with respect to a right direction 320 of FIG. 3 using Equation 8, $\Delta G_V^U$ is calculated with respect to an up direction 330 of FIG. 3 using Equation 9, and $\Delta G_V^D$ is calculated with respect to a down direction 340 of FIG. 3 using Equation 10.

$$\Delta G_H^L = G_{i,j-1} - \frac{R_{i,j-2} + R_{i,j}}{2} \quad \text{Equation 7}$$

$$\Delta G_H^R = G_{i,j+1} - \frac{R_{i,j+2} + R_{i,j}}{2} \quad \text{Equation 8}$$

$$\Delta G_V^U = G_{i-1,j} - \frac{R_{i-2,j} + R_{i,j}}{2} \quad \text{Equation 9}$$

$$\Delta G_V^D = G_{i+1,j} - \frac{R_{i+2,j} + R_{i,j}}{2} \quad \text{Equation 10}$$

In Equation 6, $\gamma_H^L$, $\Delta_H^R$, $\gamma_V^U$, and $\gamma_V^D$ denote the directional interpolation weights defined with respect to the left, right, up, and down directions of (I,J), respectively, and are calculated using Equations 11 through 14, respectively.

$$\gamma_H^L = \frac{1}{\sqrt{1 + \left(\dfrac{G_{i,j-1} - G_{i,j+1}}{2}\right)^2 + \left(\dfrac{R_{i,j-2} - R_{i,j}}{2}\right)^2}} \quad \text{Equation 11}$$

$$\gamma_H^R = \frac{1}{\sqrt{1 + \left(\dfrac{G_{i,j-1} - G_{i,j+1}}{2}\right)^2 + \left(\dfrac{R_{i,j+2} - R_{i,j}}{2}\right)^2}} \quad \text{Equation 12}$$

$$\gamma_V^U = \frac{1}{\sqrt{1 + \left(\dfrac{G_{i-1,j} - G_{i+1,j}}{2}\right)^2 + \left(\dfrac{R_{i-2,j} - R_{i,j}}{2}\right)^2}} \quad \text{Equation 13}$$

$$\gamma_V^D = \frac{1}{\sqrt{1 + \left(\dfrac{G_{i-1,j} - G_{i+1,j}}{2}\right)^2 + \left(\dfrac{R_{i+2,j} - R_{i,j}}{2}\right)^2}} \quad \text{Equation 14}$$

FIG. 1B is similar to FIG. 1A except that R exchanges places with B. Accordingly, in FIG. 1B illustrating the 5×5 bayer CFA pattern having a B pixel positioned at its center, the unknown G pixel value $G'_{i,j}$ is calculated using the same Equations 6 through 14 as those for FIG. 1A except that $R_{p,q}$ is replaced with $B_{p,q}$.

The interpolation unit 130 interpolates an R pixel and a B pixel after the G pixel interpolation. For example, in FIG. 1B illustrating the 5×5 bayer CFA pattern having a B pixel at its center, an unknown R pixel value $R'_{i,j}$ is interpolated using Equation 15.

$$R'_{i,j} = G'_{i,j} + \frac{\gamma_H^L \Delta R_H^L + \gamma_H^R \Delta R_H^R + \gamma_V^U \Delta R_V^U + \gamma_V^D \Delta R_V^D}{\gamma_H^L + \gamma_H^R + \gamma_V^U + \gamma_V^D} \quad \text{Equation 15}$$

where $\Delta R_H^L$, $\Delta R_H^R$, $\Delta R_V^U$, and $\Delta R_V^D$ denote color differences defined with respect to the left, right, up, and down directions of (I,J), respectively. The definition of the color differences $\Delta R_H^L$, $\Delta R_H^R$, $\Delta R_V^U$, and $\Delta R_V^D$ is obtained by rotating the CFA pattern depicted in FIG. 1B clockwise by 45 degrees. The color differences $\Delta R_H^L$, $\Delta R_H^R$, $\Delta R_V^U$, and $\Delta R_V^D$ are defined with respect to the left, right, up, and down directions of (I,J) as illustrated in FIG. 4A and calculated using Equations 16 through 19, respectively.

$$\Delta R_H^L = R_{i+1,j-1} - G'_{i+1,j-1} \quad \text{Equation 16}$$

$$\Delta R_H^R = R_{i-1,j+1} - G'_{i-1,j+1} \quad \text{Equation 17}$$

$$\Delta R_V^U = R_{i-1,j-1} - G'_{i-1,j-1} \quad \text{Equation 18}$$

$$\Delta R_V^D = R_{i+1,j+1} - G'_{i+1,j+1} \quad \text{Equation 19}$$

In Equation 15, $\gamma_H^L$, $\gamma_H^R$, $\gamma_V^U$, and $\gamma_V^D$ denote the directional interpolation weights defined with respect to the left, right, up, and down directions, respectively, similar to Equation 6, and are calculated using Equations 20 through 23, respectively.

$$\gamma_H^L = \frac{1}{\sqrt{1+\left(\frac{R_{i+1,j-1}-R_{i-1,j+1}}{2}\right)^2+\left(\frac{B_{i+2,j-2}-B_{i,j}}{2}\right)^2}} \quad \text{Equation 20}$$

$$\gamma_H^R = \frac{1}{\sqrt{1+\left(\frac{R_{i+1,j-1}-R_{i-1,j+1}}{2}\right)^2+\left(\frac{B_{i-2,j+2}-B_{i,j}}{2}\right)^2}} \quad \text{Equation 21}$$

$$\gamma_V^U = \frac{1}{\sqrt{1+\left(\frac{R_{i-1,j-1}-R_{i+1,j+1}}{2}\right)^2+\left(\frac{B_{i-2,j-2}-B_{i,j}}{2}\right)^2}} \quad \text{Equation 22}$$

$$\gamma_V^D = \frac{1}{\sqrt{1+\left(\frac{R_{i-1,j-1}-R_{i+1,j+1}}{2}\right)^2+\left(\frac{B_{i+2,j+2}-B_{i,j}}{2}\right)^2}} \quad \text{Equation 23}$$

According to an embodiment of the present invention, the R pixel is interpolated using the directional interpolation weights corresponding to FIG. 1B calculated according to Equations 20 through 23.

FIG. 1A is similar to FIG. 1B except that B exchanges places with R. Accordingly, in FIG. 1A illustrating the 5×5 bayer CFA pattern having an R pixel at its center, an unknown B pixel value $B'_{i,j}$ is calculated using the same Equations 15 through 23 as those for FIG. 1B except that $B_{p,q}$ is replaced by $R_{p,q}$.

In FIG. 1C, for R/B pixel interpolations, the directional interpolation weights $\gamma_H^L$, $\gamma_H^R$, $\gamma_V^U$, and $\gamma_V^D$ are estimated using Equations 11 through 14 by replacing $R_{p,q}$ with $G_{p,q}$ and replacing $G_{p,q}$ with $B_{p,q}$ in Equations 11 and 12 and with $R_{p,q}$ in Equations 13 and 14. An unknown R pixel value $R'_{p,q}$ is interpolated using Equation 15, color differences, and the directional interpolation weights. The color differences are defined as in Equations 24 through 27.

$$\Delta R_H^L = R'_{i,j-1} - G'_{i,j-1} \quad \text{Equation 24}$$

$$\Delta R_H^R = R'_{i,j+1} - G'_{i,j+1} \quad \text{Equation 25}$$

$$\Delta R_V^U = R_{i-1,j} - G'_{i-1,j} \quad \text{Equation 26}$$

$$\Delta R_V^D = R_{i+1,j} - G'_{i+1,j} \quad \text{Equation 27}$$

An unknown B pixel $B'_{p,q}$ is interpolated using Equation 15 and color differences $\Delta B_H^L$, $\Delta B_H^R$, $\Delta B_V^U$, and $\Delta B_V^D$ of a B pixel instead of the color differences $\Delta R_H^L$, $\Delta R_H^R$, $\Delta R_V^U$, and $\Delta R_V^D$ of an R pixel. The color differences $\Delta B_H^L$, $\Delta B_H^R$, $\Delta B_V^U$, and $\Delta B_V^D$ are obtained by replacing $R'_{p,q}$ with $B_{p,q}$ in Equations 24 and 25 and with $B'_{p,q}$ in Equations 26 and 27. As illustrated in FIGS. 4C and 4D, left, right, up, and down directions are defined differently according to central pixels.

The adjusting unit 140 adjusts the interpolated pixel values by adding a high frequency component value of a known pixel to the interpolated pixel values. The adjusting unit 140 may be optionally included in the image interpolation apparatus 100.

According to an embodiment of the present invention, demosaiced images are reinforced by adjustment. The demosaiced images, for example, R', G', and B' images, may include prominent artifacts such as a zipper artifact, blurring, and false color, and these artifacts appear mainly in high frequency regions of the demosaiced images. Accordingly, the adjusting unit 140 adjusts the demosaiced images by using a high frequency component having an inter-channel correlation between R/G/B channels.

For example, a G pixel is updated by adding a high-frequency component of a R or B pixel to the G pixel, and the high-frequency component of the R or B pixel is a known pixel value in a CFA pattern. For example, in FIG. 1A illustrating the 5×5 bayer CFA pattern having an R pixel at its center, G/B components are adjusted.

An adjusted G component $\hat{G}_{i,j}$ is calculated using Equations 28 and 29.

$$\hat{G}_{i,j} = G'_{i,j} + R_{i,j}^h \quad \text{Equation 28}$$

$$R_{i,j}^h = R_{i,j} - R_{i,j}^l \quad \text{Equation 29}$$

where $G'_{i,j}$ denotes an interpolated G pixel value at a position (i,j) obtained by adaptive interpolation, $R^h_{i,j}$ denotes the high frequency component of an R channel, and $R^l_{i,j}$ denotes a low-frequency component filtered by a 3-tap 1-D filter [⅓, ⅓, ⅓] in a detected horizontal or vertical edge direction. Similarly, a B pixel may be adjusted similarly to the G pixel by replacing $\hat{G}_{i,j}$ with $\hat{B}_{i,j}$ and $G'_{i,j}$ with $B'_{i,j}$ in Equations 28 and 29. For example, in FIGS. 1B and 1C illustrating the 5×5 bayer CFA patterns respectively having B and G pixels at their centers, R/G and R/B components are adjusted, respectively, similar to adjusting the G/B components of the bayer CFA pattern having an R pixel at its center. After these adjustment operations, the adjusting unit 140 outputs demosaiced images $\hat{R}$, $\hat{G}$, and $\hat{B}$.

FIGS. 5A through 5D are views for comparing an image interpolated according to an embodiment of the present invention with images interpolated according to different conventional demosaicing algorithms in terms of visual quality.

Figures 5A, 5B, 5C, 5D:
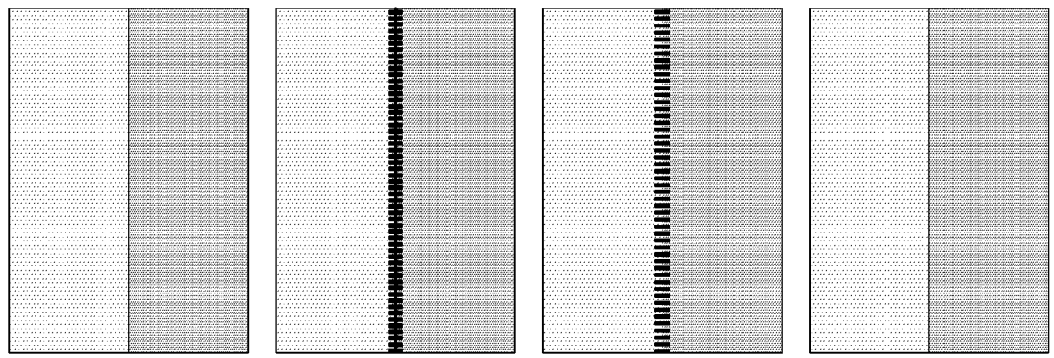
FIGS. 5A through 5D are views for comparing an image interpolated according to an example of an embodiment of the present invention with images interpolated according to different conventional demosaicing algorithms in terms of visual quality.

FIG. 5A illustrates an original image, FIGS. 5B and 5C illustrate the images interpolated according to different conventional demosaicing algorithms, and FIG. 5D illustrates the image interpolated according to an embodiment of the present invention.

As can be intuitively known from FIGS. 5B and 5C, color edges demosaiced by interpolation are blurred, or the zipper effect appears along a vertical color edge. In the image illustrated in FIG. 5D, which has been demosaiced, no zipper effects occur, and a satisfactory result is shown.

Figure 6A:
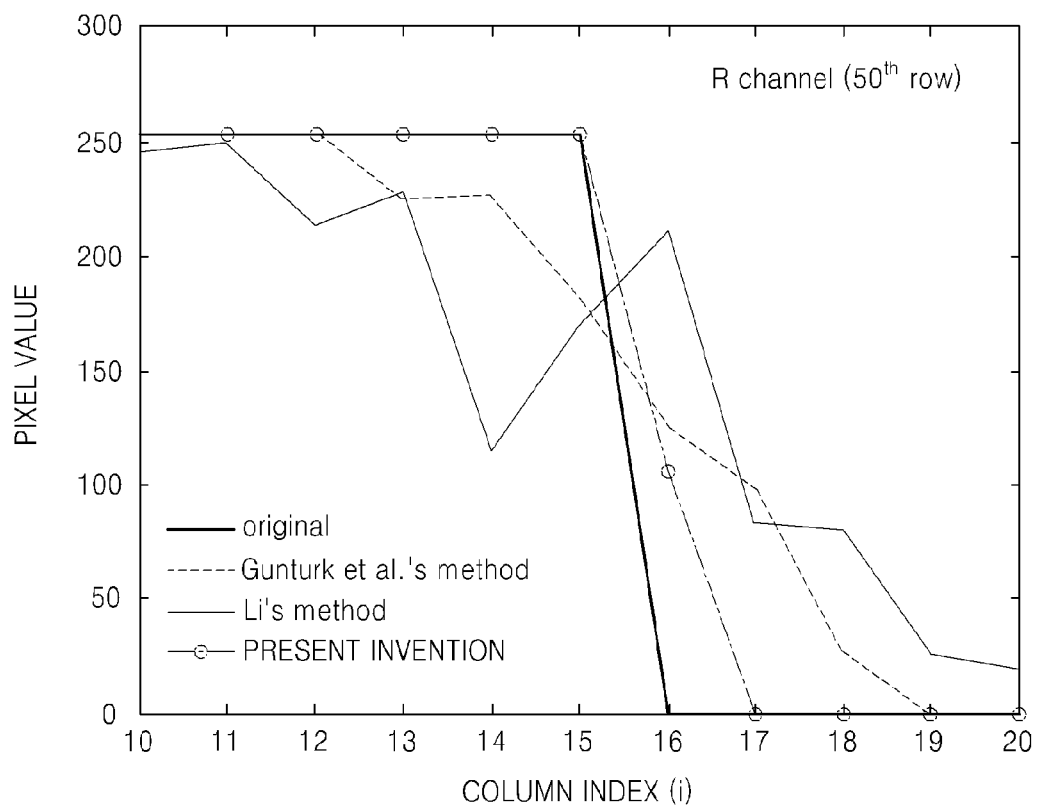
FIGS. 6A through 6C are views for comparing an image interpolated according to an example of an embodiment of the present invention with images interpolated according to different conventional demosaicing algorithms in terms of a pixel intensity profile.
Figure 6B:
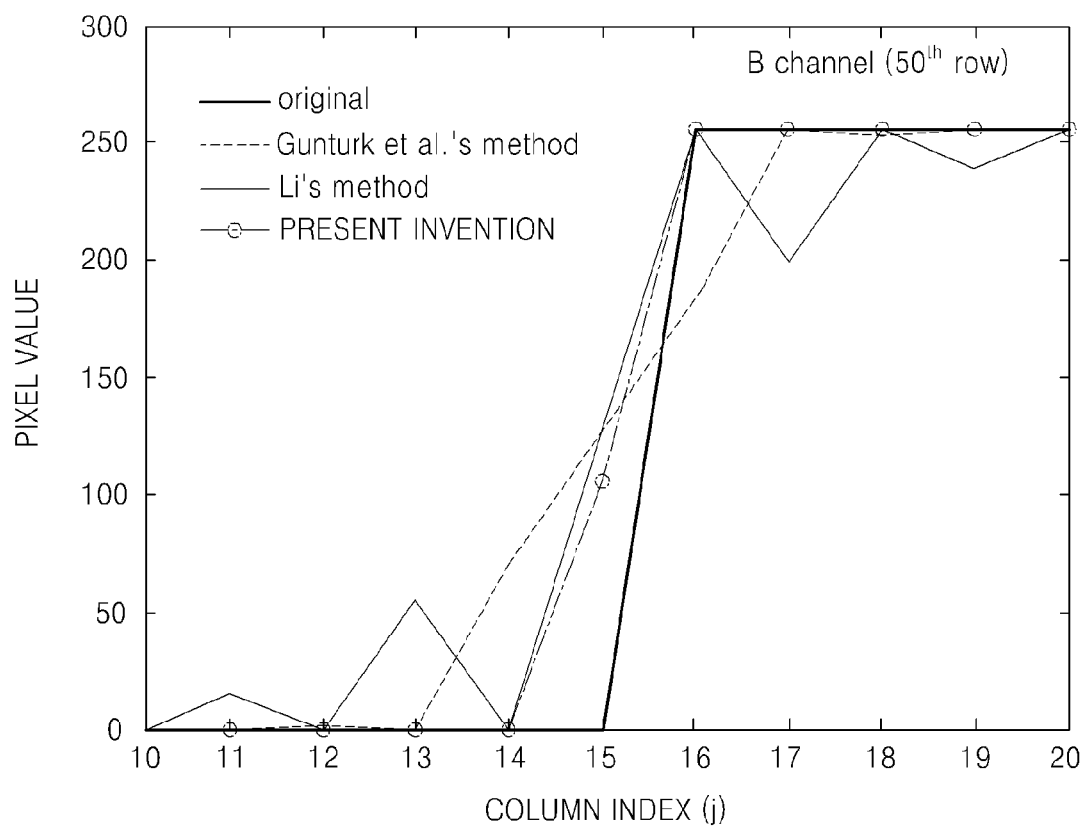
Figure 6C:
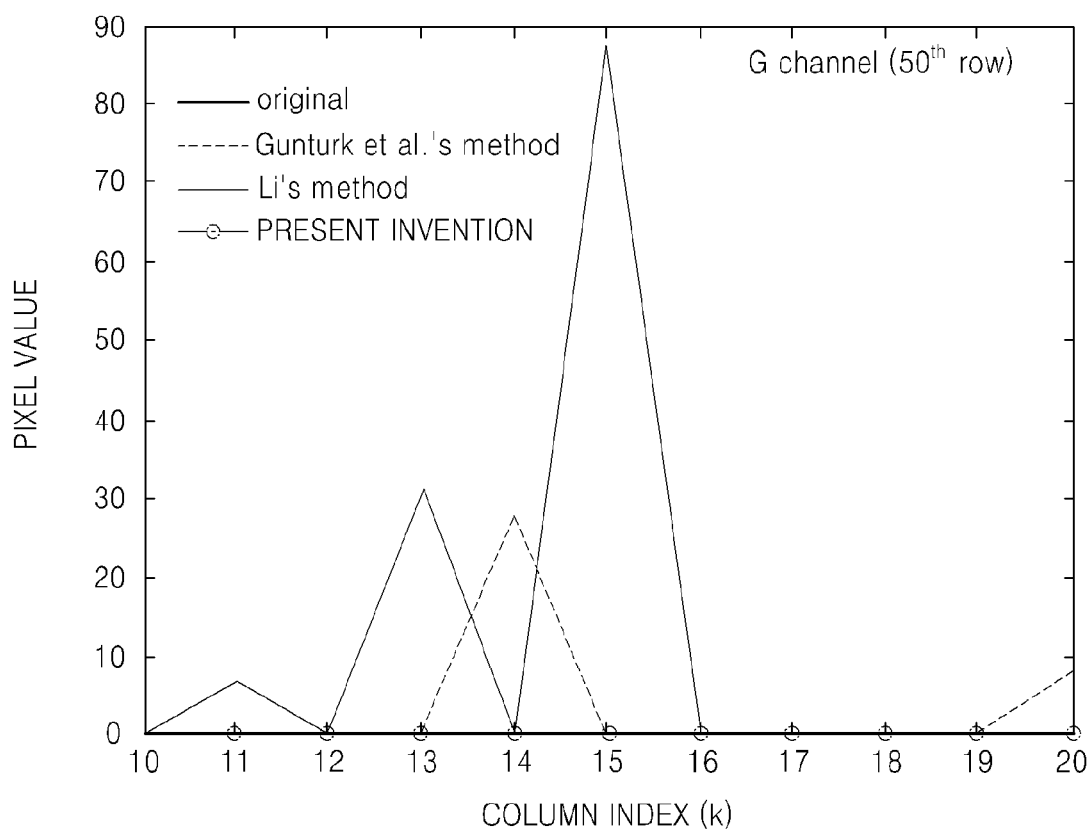

FIGS. 6A through 6C are views for comparing an image interpolated using an image interpolation method according to an embodiment of the present invention with images interpolated according to different conventional demosaicing algorithms in terms of a pixel intensity profile.

FIGS. 6A through 6C illustrate one-dimensional intensity profiles of R, G, and B channels along 50 rows on the test image of FIG. 5A. A color edge is a sharp boundary between two colors (for example, R and B, where G is 0). In the image interpolation method according to an embodiment of the present invention, horizontal and vertical DAIDs are calculated directly from a CFA image in order to determine the direction of interpolation. 3 color components, R/G/B colors, are interpolated in either a horizontal or vertical direction in consideration of the DAIDs $D_H$ and $D_V$. In the image interpolating method according to an embodiment of the present invention, a sharp color edge of a resultant image is maintained without blurring and zipper effects.

The image interpolating method according to an embodiment of the present invention provides a large Peak Signal and Noise Ratio (PSNR), greater Structural Similarity (SSIM), and high visual quality images compared with the conventional image interpolation algorithms. In particular, a PSNR for images having a plurality of color edges in the image interpolation method according to an embodiment of the present invention is greater than those according to the conventional image interpolation algorithms. In addition, an SSIM for images having color sharp edges and natural backgrounds in the image interpolation method according to an embodiment of the present invention is greater than those according to the conventional image interpolation algorithms.

Figure 7:
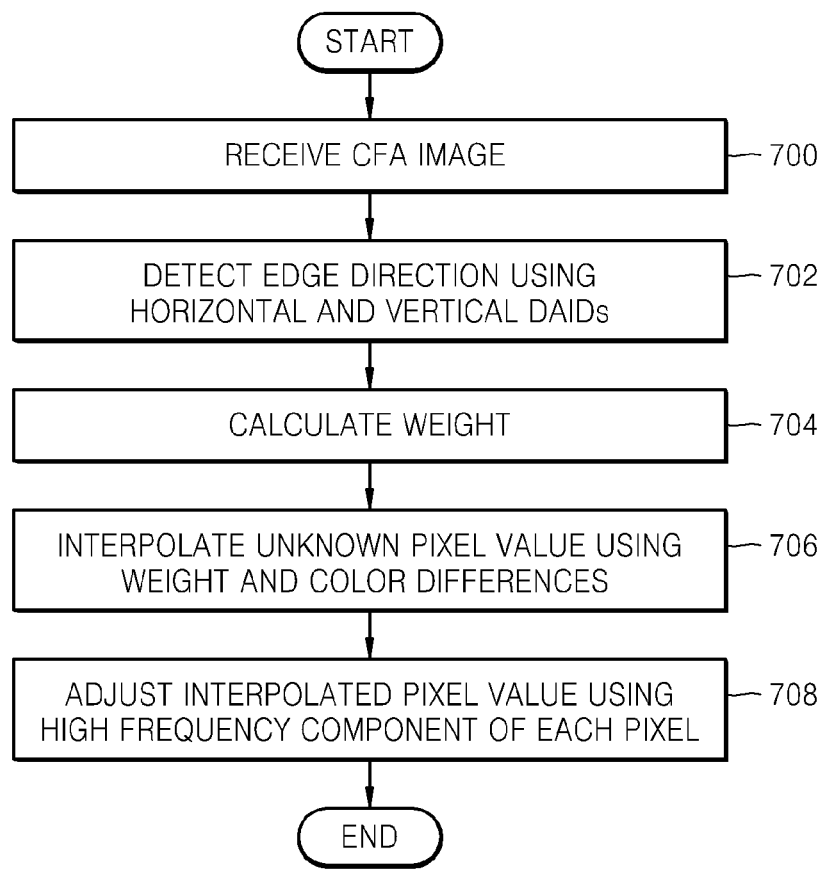
FIG. 7 is a flowchart of an example of an image interpolating method using the characteristics of a CFA pattern.

FIG. 7 is a flowchart of an image interpolating method using the characteristics of a CFA pattern, according to an example of an embodiment of the present invention.

Referring to FIG. 7, in operation 700, a CFA image is received. The CFA image is a not-demosaiced RGB pattern. FIG. 1 is an example of a not-demosaiced RGB pattern. In operation 702, an edge direction is detected using horizontal and vertical DAIDs $D_H$ and $D_V$. Examples of this are discussed above with regard to equations 1 and 2. In operation 704, a weight is calculated. Examples of this are discussed above with regard to equations 11-14. In operation 706, an unknown pixel value is interpolated using the weight calculated in operation 704 and color differences according to the edge direction detected in operation 702. Examples of this are discussed above with regard to equation 6. Optionally, in operation 708, the interpolated pixel value is adjusted using a high frequency component of each pixel. Examples of this are discussed above with regard to equation 15.

According to an embodiment of the present invention, there is provided an image interpolating method and apparatus using the characteristics of a CFA pattern. In other words, an edge direction and directional interpolation weights are calculated directly from a CFA image by using DAIDs. According to a result of an experiment on a plurality of various images, in terms of a PSNR, an SSIM, and a visual quality, the image interpolating method using the characteristics of a CFA pattern is a demosaicing method that is more effective with respect to the zipper effect and color artifacts.

Although the 5×5 bayer CFA patterns are illustrated in the above-described embodiments, a CFA pattern is not limited to 5×5 pixel patterns, and image interpolation may be performed on a pixel larger than 5×5 pixels. Additionally, one skilled in the art would recognize how to adapt the methods described above for different CFA patterns formed with different colors and/or with different decimation values for the colors.

An algorithm proposed by the present invention reduces the zipper effect appearing around vivid color edges and texturing of a color image. A conventional demosaicing algorithm is simulated to test the performance of the proposed algorithm. Results of the simulation are compared with the conventional demosaicing algorithm in terms of a PSNR, an SSIM, and a visual quality. The performance of the proposed algorithm is higher than well-known techniques and reduces the zipper effect appearing around the color edges and texturing of a color image compared with well-known techniques.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and so on. The computer readable recording medium can also be distributed over network coupled computer systems so that the computer readable code is stored and executed in a distributed fashion.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image interpolating method comprising:
   detecting an edge direction by calculating absolute inter-channel differences with respect to left, right, up, and down directions of a central pixel of a color filter array according to pattern characteristics of R, G, and B pixels arranged in the color filter array, the absolute inter-channel differences being calculated by subtracting the absolute value of a difference between a color intensity value of a pixel of a first color channel on one side of the central pixel and a color intensity value of a neighboring pixel of a second color channel on the one side of the central pixel, from the absolute value of a difference between a color intensity value of a pixel of the first color channel on a symmetrically opposite side of the central pixel and a color intensity value of a neighboring pixel of the second color channel on the symmetrically opposite side of the central pixel;

calculating directional interpolation weights for the left, right, up, and down directions, respectively, according to the pattern characteristics of the R, G, and B pixels; and interpolating an unknown pixel value using color differences between the R, G, and B pixels with respect to the left, right, up, and down directions of the center pixel and the directional interpolation weights according to the detected edge direction.

2. The image interpolating method of claim 1, wherein the absolute inter-channel differences are differences between values of pixels that are adjacent to each other in the left, right, up, and down directions.

3. The image interpolating method of claim 2, wherein the detecting of the edge direction comprises calculating a horizontal difference $D_H$ for the left and right directions and a vertical difference $D_V$ for the up and down directions from the absolute inter-channel differences with respect to the left, right, up, and down directions.

4. The image interpolating method of claim 3, wherein the detecting of the edge direction comprises, if the central pixel of the color filter array is $R_{i,j}$, calculating the horizontal difference $D_H$ and the vertical difference $D_V$ according to the following Equations 4 and 5:

$$D_H = D_H^L - D_H^R = |R_{i,j-2} - G_{i,j-1}| - |R_{i,j+2}| - |R_{i,j+2} - G_{i,j+1}| \quad \text{[Equation 4]}$$

$$D_V = D_V^U - D_V^D = |R_{i-2,j} - G_{i-1,j}| - |R_{i+2,j} - G_{i+1,j}| \quad \text{[Equation 5]}$$

where $R_{p,q}$ and $G_{p,q}$ denote color intensity values at positions (p,q) in the R and G channels, respectively, and $D_H^L$, $D_H^R$, $D_V^U$, and $D_V^D$ denote inter-channel differences with respect to the left, right, up, and down directions, respectively.

5. The image interpolating method of claim 4, wherein the interpolating of the unknown pixel value comprises, if the central pixel of the color filter array is $R_{i,j}$, interpolating an unknown G pixel value according to the following Equation 6:

$$G'_{i,j} = \begin{cases} R_{i,j} + \dfrac{\gamma_H^L \Delta G_H^L + \gamma_H^R \Delta G_H^R}{\gamma_H^L + \gamma_H^R}, & D_H < D_V \\ R_{i,j} + \dfrac{\gamma_V^U \Delta G_V^U + \gamma_V^D \Delta G_V^D}{\gamma_V^U + \gamma_V^D}, & D_H > D_V \\ R_{i,j} + \dfrac{\gamma_H^L \Delta G_H^L + \gamma_H^R \Delta G_H^R + \gamma_V^U \Delta G_V^U + \gamma_V^D \Delta G_V^D}{\gamma_H^L + \gamma_H^R + \gamma_V^U + \gamma_V^D}, & \text{otherwise} \end{cases} \quad \text{Equation 6}$$

where $G'_{i,j}$ denotes an interpolated G pixel value, $\Delta G_H^L$, $\Delta G_H^R$, $\Delta G_V^U$, and $\Delta G_V^D$ denote color differences defined with respect to the left, right, up, and down directions, respectively, and $\gamma_H^L$, $\gamma_H^R$, $\gamma_V^U$, and $\gamma_V^D$ denote directional interpolation weights defined with respect to the left, right, up, and down directions, respectively.

6. The image interpolating method of claim 3, wherein the interpolating of the unknown pixel value comprises, after a G pixel from among unknown pixels is interpolated, interpolating the values of the other unknown pixels using a pixel value G' of the interpolated G pixel.

7. The image interpolating method of claim 6, wherein the interpolating of the unknown pixel value comprises, if the central pixel of the color filter array is $B_{i,j}$, interpolating an unknown R pixel value according to the following Equation 15:

$$R'_{i,j} = G'_{i,j} + \frac{\gamma_H^L \Delta R_H^L + \gamma_H^R \Delta R_H^R + \gamma_V^U \Delta R_V^U + \gamma_V^D \Delta R_V^D}{\gamma_H^L + \gamma_H^R + \gamma_V^U + \gamma_V^D} \quad \text{[Equation 15]}$$

where $R'_{i,j}$ and $G'_{i,j}$ denotes interpolated pixel values, $\Delta R_H^L$, $\Delta R_H^R$, $\Delta R_V^U$, and $\Delta R_V^D$ denote color differences defined with respect to the left, right, up, and down directions of the center pixel, respectively, $\Delta R_H^L = R_{i+1,j-1} - G'_{i+1,j-1}$, $\Delta R_H^R = R_{i-1,j+1} - G'_{i-1,j+1}$, $\Delta R_V^U = R_{i-1,j-1} - G'_{i-1,j-1}$, and $\Delta R_V^D = R_{i+1,j+1} - G'_{i+1,j+1}$, and $\gamma_H^L$, $\gamma_H^R$, $\gamma_V^U$, and $\gamma_V^D$ denote directional interpolation weights defined with respect to the left, right, up, and down directions, respectively.

8. The image interpolating method of claim 7, wherein, if the central pixel of the color filter array is $G_{i,j}$, the color differences defined with respect to the left, right, up, and down directions in Equation 15 are $\Delta R_H^L = R'_{i,j-1} - G'_{i,j-1}$, $\Delta R_H^R = R'_{i,j+1} - G'_{i,j+1}$, $\Delta R_V^U = R_{i+1,j} - G'_{i-1,j}$, and $\Delta R_V^D = R_{i+1,j} - G'_{i+1,j}$, respectively.

9. The image interpolating method of claim 1, further comprising adjusting the interpolated pixel value by adding a high frequency component of a known pixel to the interpolated pixel value.

10. A non-transitory computer readable recording medium encoded with computer-executable instructions that when executed by a computer perform the following method:

detecting an edge direction by calculating absolute inter-channel differences with respect to left, right, up, and down directions of a central pixel of a color filter array according to pattern characteristics of R, G, and B pixels arranged in the color filter array, the absolute inter-channel differences being calculated by subtracting the absolute value of a difference between a color intensity value of a pixel of a first color channel on one side of the central pixel and a color intensity value of a neighboring pixel of a second color channel on the one side of the central pixel, from the absolute value of a difference between a color intensity value of a pixel of the first color channel on a symmetrically opposite side of the central pixel and a color intensity value of a neighboring pixel of the second color channel on the symmetrically opposite side of the central pixel;

calculating directional interpolation weights for the left, right, up, and down directions, respectively, according to the pattern characteristics of the R, G, and B pixels; and interpolating an unknown pixel value using color differences between the R, G, and B pixels with respect to the left, right, up, and down directions of the center pixel and the directional interpolation weights according to the detected edge direction.

11. An image interpolating apparatus comprising:

an edge direction detection unit configured to detect an edge direction by calculating absolute inter-channel differences with respect to left, right, up, and down directions of a central pixel of a color filter array according to pattern characteristics of R, G, and B pixels arranged in the color filter array, the absolute inter-channel differences being calculated by subtracting the absolute value of a difference between a color intensity value of a pixel of a first color channel on one side of the central pixel and a color intensity value of a neighboring pixel of a second color channel on the one side of the central pixel, from the absolute value of a difference between a color intensity value of a pixel of the first color channel on a symmetrically opposite side of the central pixel and a color intensity value of a neighboring pixel of the second color channel on the symmetrically opposite side of the central pixel;

a weight calculation unit configured to calculate directional interpolation weights for the left, right, up, and down directions, respectively, according to the pattern characteristics of the R, G, and B pixels; and an interpolation unit configured to interpolate an unknown pixel value using color differences between the R, G, and B pixels with respect to the left, right, up, and down directions and the directional interpolation weights according to the detected edge direction.

12. The image interpolating apparatus of claim 11, wherein the absolute inter-channel differences are differences between values of pixels that are adjacent to each other in the left, right, up, and down directions.

13. The image interpolating apparatus of claim 12, wherein the edge direction detection unit calculates a horizontal difference $D_H$ for the left and right directions and a vertical difference $D_V$ for the up and down directions from the absolute inter-channel differences with respect to the left, right, up, and down directions.

14. The image interpolating apparatus of claim 13, wherein, if the central pixel of the color filter array is $R_{i,j}$, the edge direction detection unit calculates the horizontal difference $D_H$ and the vertical difference $D_V$ according to the following Equations 4 and 5:

$$D_H = D_H^L - D_H^R = |R_{i,j-2} - G_{i,j-1}| - |R_{i,j+2} - G_{i,j+1}| \quad \text{[Equation 4]}$$

$$D_V = D_V^U - D_V^D = |R_{i-2,j} - G_{i-1,j}| - |R_{i+2,j} - G_{i+1,j}| \quad \text{[Equation 5]}$$

where $R_{p,q}$ and $G_{p,q}$ denote color intensity values at positions (p,q) in the R and G channels, respectively, and $\Delta D_H^L$, $\Delta D_H^R$, $\Delta D_V^U$, and $D_V^D$ denote inter-channel differences with respect to the left, right, up, and down directions of the center pixel, respectively.

15. The image interpolating apparatus of claim 14, wherein, if the central pixel of the color filter array is $R_{i,j}$, the interpolation unit interpolates an unknown G pixel value according to the following Equation 6:

$$G'_{i,j} = \begin{cases} R_{i,j} + \dfrac{\gamma_H^L \Delta G_H^L + \gamma_H^R \Delta G_H^R}{\gamma_H^L + \gamma_H^R}, & D_H < D_V \\ R_{i,j} + \dfrac{\gamma_V^U \Delta G_V^U + \gamma_V^D \Delta G_V^D}{\gamma_V^U + \gamma_V^D}, & D_H > D_V \\ R_{i,j} + \dfrac{\gamma_H^L \Delta G_H^L + \gamma_H^R \Delta G_H^R + \gamma_V^U \Delta G_V^U + \gamma_V^D \Delta G_V^D}{\gamma_H^L + \gamma_H^R + \gamma_V^U + \gamma_V^D}, & \text{otherwise} \end{cases} \quad \text{Equation 6}$$

where $G'_{i,j}$ denotes an interpolated G pixel value, $\Delta G_H^L$, $\Delta G_H^R$, $\Delta G_V^U$, and $\Delta G_V^D$ denote color differences defined with respect to the left, right, up, and down directions, respectively, and $\gamma_H^L$, $\gamma_H^R$, $\gamma_V^U$, and $\gamma_V^D$ denote directional interpolation weights defined with respect to the left, right, up, and down directions, respectively.

16. The image interpolating apparatus of claim 13, wherein, after a G pixel from among unknown pixels is interpolated, the interpolation unit interpolates the values of the other unknown pixels using a pixel value G' of the interpolated G pixel.

17. The image interpolating apparatus of claim 16, wherein, if the central pixel of the color filter array is $B_{i,j}$, the interpolation unit interpolates an unknown R pixel value according to the following Equation 15:

$$R'_{i,j} = G'_{i,j} + \frac{\gamma_H^L \Delta R_H^L + \gamma_H^R \Delta R_H^R + \gamma_V^U \Delta R_V^U + \gamma_V^D \Delta R_V^D}{\gamma_H^L + \gamma_H^R + \gamma_V^U + \gamma_V^D} \quad \text{[Equation 15]}$$

where $R'_{i,j}$ and $G'_{i,j}$ denotes interpolated pixel values, $\Delta R_H^L$, $\Delta R_H^R$, $\Delta R_V^U$, and $\Delta R_V^D$ denote color differences defined with respect to the left, right, up, and down directions of the center pixel, respectively, $\Delta R_H^L = R_{i+1,j-1} - G'_{i+1,j-1}$, $\Delta R_H^R = R_{i-1,j+1} - G'_{i-1,j+1}$, $\Delta R_V^U = R_{i-1,j-1} - G'_{i-1,j-1}$, and $\gamma_H^L$, $\gamma_H^R$, $\gamma_V^U$, and $\gamma_V^D$ denote directional interpolation weights defined with respect to the left, right, up, and down directions, respectively.

18. The image interpolating apparatus of claim 17, wherein, if the central pixel of the color filter array is $G_{i,j}$, the color differences defined with respect to the left, right, up, and down directions in Equation 15 are $\Delta R_H^L = R'_{i,j-1} - G'_{i,j-1}$, $\Delta R_H^R = R'_{i,j+1} - G'_{i,j+1}$, $\Delta R_V^U = R_{i-1,j} - G'_{i-1,j}$, and $\Delta R_V^D = R_{i+1,j} - G'_{i+1,j}$, respectively.

19. The image interpolating apparatus of claim 11, further comprising an adjusting unit for adjusting the interpolated pixel value by adding a high frequency component of a known pixel to the interpolated pixel value.

20. An image interpolating method comprising:
detecting an edge direction by calculating absolute inter-channel differences with respect to left, right, up, and down directions of a central pixel of a color filter array according to pattern characteristics of different color pixels arranged in the color filter array, the absolute inter-channel differences being calculated by subtracting the absolute value of a difference between a color intensity value of a pixel of a first color channel on one side of the central pixel and a color intensity value of a neighboring pixel of a second color channel on the one side of the central pixel, from the absolute value of a difference between a color intensity value of a pixel of the first color channel on a symmetrically opposite side of the central pixel and a color intensity value of a neighboring pixel of the second color channel on the symmetrically opposite side of the central pixel;

calculating directional interpolation weights for the left, right, up, and down directions, respectively, according to the pattern characteristics of the different color pixels; and interpolating an unknown pixel value using color differences between the different color pixels with respect to the left, right, up, and down directions of the center pixel and the directional interpolation weights according to the detected edge direction.

* * * * *

UNITED STATES PATENT AND TRADEMARK OFFICE
CERTIFICATE OF CORRECTION

PATENT NO. : 8,571,312 B2
APPLICATION NO. : 12/689312
DATED : October 29, 2013
INVENTOR(S) : Soon-keun Chang et al.

Page 1 of 1

It is certified that error appears in the above-identified patent and that said Letters Patent is hereby corrected as shown below:

IN THE CLAIMS:

In Claim 4, Column 13, line 28, replace $$D_H = D_H^L - D_H^R = |R_{i,j-2} - G_{i,j-1}| - |R_{i,j+2}| - |R_{i,j+2} - G_{i,j+1}|$$

with -- $D_H = D_H^L - D_H^R = |R_{i,j-2} - G_{i,j-1}| - |R_{i,j+2} - G_{i,j-1}|$ --

In Claim 14, Column 15, lines 33-34, replace
$\Delta D_H^L$, $\Delta D_H^R$, $\Delta D_V^U$, and $D_V^D$ with -- $\Delta D_H^L$, $\Delta D_H^R$, $\Delta D_V^U$, and $D_V^D$ --

In Claim 17, Column 16, Lines 19-20, replace pixel, respectively, $\Delta R_H^L = R_{i+1,j-1} - G'_{i+1,j-1}$, $\Delta R_H^R = R_{i-1,j+1} - G'_{i-1,j+1}$, $\Delta R_V^U = R_{i-1,j-1} - G'_{i-1,j-1}$, and $\gamma_H^L$, $\gamma_H^R$, $\gamma_V^U$, and $\gamma_V^D$ with -- pixel, respectively, $\Delta R_H^L = R_{i+1,j-1} - G'_{i+1,j-1}$, $\Delta R_H^R = R_{i-1,j+1} - G'_{i-1,j+1}$, $\Delta R_V^U = R_{i-1,j-1} - G'_{i-1,j-1}$, and $\Delta R_V^D = R_{i+1,j+1} - G'_{i+1,j+1}$, and $\gamma_H^L$, $\gamma_H^R$, $\gamma_V^U$, and $\gamma_V^D$ --

Signed and Sealed this
Seventh Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,571,312 B2  
APPLICATION NO. : 12/689312  
DATED : October 29, 2013  
INVENTOR(S) : Soon-keun Chang et al.

Page 1 of 1

It is certified that error appears in the above-identified patent and that said Letters Patent is hereby corrected as shown below:

IN THE CLAIMS:

In Claim 4, Column 13, line 28, replace $$D_H = D_H^L - D_H^R = |R_{i,j-2} - G_{i,j-1}| - |R_{i,j+2}| - |R_{i,j+2} - G_{i,j+1}|$$

with -- $D_H = D_H^L - D_H^R = |R_{i,j-2} - G_{i,j-1}| - |R_{i,j+2} - G_{i,j+1}|$ --

In Claim 14, Column 15, lines 33-34, replace $\Delta D_H^L$, $\Delta D_H^R$, $\Delta D_V^U$, and $D_V^D$ with -- $D_H^L$, $D_H^R$, $D_V^U$, and $D_V^D$ --

In Claim 17, Column 16, Lines 19-20, replace pixel, respectively, $G'_{i-1,j+1}$, $\Delta R_H^L = R_{i+1,j-1} - G'_{i+1,j-1}$, $\Delta R_H^R = R_{i-1,j+1} - G'_{i-1,j+1}$, $\Delta R_V^U = R_{i-1,j-1} - G'_{i-1,j-1}$, and $\gamma_H^L$, $\gamma_H^R$, $\gamma_V^U$, and $\gamma_V^D$ with -- pixel, respectively, $\Delta R_H^L = R_{i+1,j-1} - G'_{i+1,j-1}$, $\Delta R_H^R = R_{i-1,j+1} - G'_{i-1,j+1}$, $\Delta R_V^U = R_{i-1,j-1} - G'_{i-1,j-1}$, and $\Delta R_V^D = R_{i+1,j+1} - G'_{i+1,j+1}$, and $\gamma_H^L$, $\gamma_H^R$, $\gamma_V^U$, and $\gamma_V^D$ --

This certificate supersedes the Certificate of Correction issued October 7, 2014.

Signed and Sealed this  
First Day of March, 2016

Michelle K. Lee  
*Director of the United States Patent and Trademark Office*